United States Patent
Sun et al.

(10) Patent No.: US 11,134,403 B2
(45) Date of Patent: Sep. 28, 2021

(54) RATE FEEDBACK FOR WIRELESS VIDEO STREAMING

(71) Applicant: Apple Inc., Cupertino, CA (US)

(72) Inventors: Ye Sun, San Jose, CA (US); Zhanfeng Jia, Belmont, CA (US); Yakun Sun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 16/142,008

(22) Filed: Sep. 26, 2018

(65) Prior Publication Data

US 2020/0100125 A1    Mar. 26, 2020

(51) Int. Cl.
*H04W 24/06*    (2009.01)
*H04W 28/02*    (2009.01)
*H04W 84/12*    (2009.01)

(52) U.S. Cl.
CPC ....... *H04W 24/06* (2013.01); *H04W 28/0289* (2013.01); *H04W 84/12* (2013.01)

(58) Field of Classification Search
CPC . H04W 24/06; H04W 28/0289; H04W 84/12; H04W 24/02; H04W 48/18; H04W 28/0205; H04W 84/042; H04W 88/10; H04L 47/30; H04L 47/10; H04L 47/263; H04L 41/5067; H04N 21/234309; H04N 21/41407; H04N 21/6373; H04N 21/6332; H04B 7/0617; H04B 7/0641; H04B 7/065; H04B 7/0626
See application file for complete search history.

(56) References Cited

U.S. PATENT DOCUMENTS

| 8,432,794 | B2 | 4/2013 | Terry |
| 8,441,955 | B2 * | 5/2013 | Wilkinson ......... H04N 21/2402 370/252 |
| 9,014,135 | B2 | 4/2015 | Yu |
| 9,735,919 | B2 | 8/2017 | Huang |

(Continued)

OTHER PUBLICATIONS

De Cicco et al.; "Feedback Control for Adaptive Live Video Streaming"; ACM; https://dl.acm.org/citation.cfm?id=1943573; Feb. 23-25, 2011; twelve pages.

*Primary Examiner* — Hardikkumar D Patel
(74) *Attorney, Agent, or Firm* — Kowert, Hood, Munyon, Rankin & Goetzel, P.C.

(57) ABSTRACT

An interface circuit in an electronic device may provide rate feedback. During operation the interface circuit may transmit one or more packets or frames associated with a data stream that are intended for the recipient electronic device, where the data stream is associated with a video encoder. Then, the interface circuit may estimate a communication performance metric associated with at least the transmissions. For example, the estimated communication performance metric comprises an effective capacity associated with a wireless link between the electronic device and the recipient electronic device. Moreover, the effective capacity may be estimated based at least in part on an efficiency of the wireless link. Next, the interface circuit may provide the rate feedback intended for the video encoder based at least in part on the estimated communication performance metric. In some embodiments, when beamforming occurs, the rate feedback may be reset.

20 Claims, 8 Drawing Sheets

(56) References Cited

U.S. PATENT DOCUMENTS

| | | | |
|---|---|---|---|
| 2010/0287297 A1* | 11/2010 | Lefebvre | H04N 21/23805 |
| | | | 709/231 |
| 2011/0158347 A1* | 6/2011 | Yeh | H04B 7/065 |
| | | | 375/296 |
| 2013/0067109 A1 | 3/2013 | Dong | |
| 2015/0264098 A1 | 9/2015 | Dao | |
| 2016/0057647 A1 | 2/2016 | Sullivan | |
| 2017/0332433 A1 | 11/2017 | Garcia | |
| 2018/0109998 A1* | 4/2018 | Ringland | H04W 48/18 |
| 2019/0029041 A1* | 1/2019 | Tomeba | H04W 72/04 |
| 2019/0305875 A1 | 10/2019 | Xue | |

* cited by examiner

RATE FEEDBACK FOR WIRELESS VIDEO STREAMING

FIELD

The described embodiments relate, generally, to wireless communications among electronic devices, and techniques for providing feedback about a video rate based at least in part on estimated communication performance during the wireless communication.

BACKGROUND

Many electronic devices communicate with each other using wireless local area networks (WLANs), such as those based on a communication protocol that is compatible with an IEEE 802.11 standard (which is sometimes referred to as 'Wi-Fi').

Recently, wireless communication in short-wavelength bands of frequencies (which is sometimes referred to as 'millimeter-wave communication') has been proposed. In principle, millimeter-wave communication offers the advantages of ultrawide bandwidth and high spatial isolation (and, thus, reduced interference and collisions).

However, because of dynamic channel or link characteristics, the communication performance of a millimeter-wave wireless link may vary. For example, because of motion or a blockage, the throughput of a millimeter-wave wireless link may decrease. This may degrade the user experience when using an application that has an associated data stream with a fix data rate.

SUMMARY

The described embodiments relate to an electronic device that provides rate feedback. This electronic device may include a node that can be communicatively coupled to an antenna, and an interface circuit communicatively coupled to the node and that communicates with a recipient electronic device. During operation, the interface circuit transmits, via the node, one or more packets or frames associated with a data stream that are intended for the recipient electronic device, wherein the data stream is associated with a video encoder. Then, the interface circuit estimates a communication performance metric associated with at least the transmission of the one or more packets or frames. Next, the interface circuit provides the rate feedback intended for the video encoder based at least in part on the estimated communication performance metric.

Note that the estimated communication performance metric may include an effective capacity associated with a wireless link between the electronic device and the recipient electronic device.

Moreover, the electronic device may be an access point.

Furthermore, the effective capacity may be estimated based at least in part on an efficiency of the wireless link. For example, the effective capacity may be estimated based at least in part on a packet-error rate (PER) and/or a modulation coding scheme (MCS) of the wireless link. Additionally, the effective capacity may be estimated based at least in part on an overhead associated with the packets or the frames. In some embodiments, the effective capacity may be estimated based at least in part on a relative access time of the electronic device during the transmissions.

Moreover, the rate feedback corresponding to the communication performance metric may be predetermined. Alternatively, the rate feedback corresponding to the communication performance metric may be dynamically determined.

Furthermore, the rate feedback may be reset when an event in the communication occurs. For example, the event may include when a beamforming condition changes (which is sometimes referred to as 'when a beamforming condition occurs').

Additionally, the rate feedback may be filtered. For example, the filtering may include low-pass filtering or averaging.

In some embodiments, there may be multiple data streams, the interface circuit may estimate multiple communication performance metrics associated with the multiple data streams, and the rate feedback may correspond to the multiple communication performance metrics. For example, the rate feedback may be a weighted average of the multiple communication performance metrics.

Moreover, in some embodiments, the rate feedback is based at least in part on at least one of: an application associated with the data stream, content associated with the data stream, or a quality-of-service (QoS) tolerance associated with the data stream.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for proving rate feedback. The method includes at least some of the aforementioned operations performed by the interface circuit in the electronic device.

Other embodiments provide the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
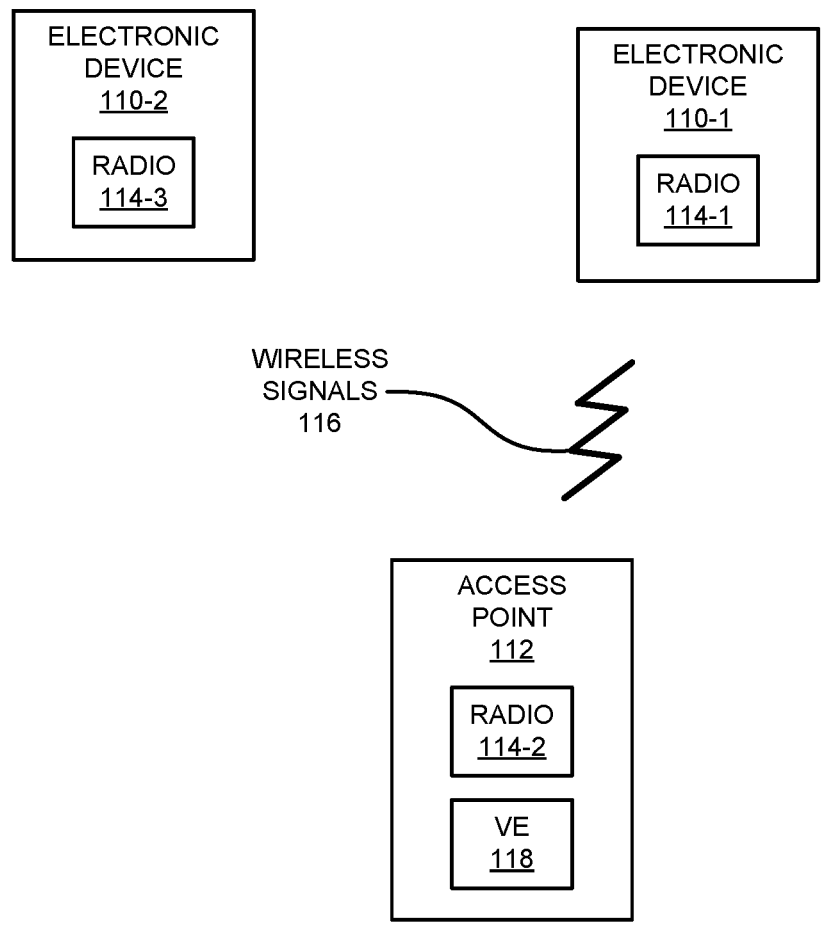
FIG. 1 is a block diagram illustrating an example of electronic devices communicating wirelessly.

An interface circuit in an electronic device may provide rate feedback. During operation the interface circuit may transmit one or more packets or frames associated with a data stream that are intended for the recipient electronic device, where the data stream is associated with a video encoder. Then, the interface circuit may estimate a communication performance metric associated with at least the transmission of the one or more packets or frames. For example, the estimated communication performance metric comprises an effective capacity associated with a wireless link between the electronic device and the recipient electronic device. Moreover, the effective capacity may be estimated based at least in part on an efficiency of the wireless link. Next, the interface circuit may provide the rate feedback intended for the video encoder based at least in part on the estimated communication performance metric. In some embodiments, when beamforming occurs, the rate feedback may be reset.

By providing the rate feedback, this communication technique may allow the video encoder to dynamically vary a data rate of video produced by the video encoder. In turn, this may allow the electronic device to dynamically varying a data rate of the data stream, so that it tracks or matches changes in the wireless link. Therefore, this capability may allow the electronic device to adapt to a dynamic wireless environment. This capability may allow video to be communicated using millimeter-wave communication, such as a 60 GHz frequency band. Consequently, the communication technique may provide ultrawide bandwidth and high spatial isolation (and, thus, reduced interference and collisions) with reliable, low-latency wireless links. Thus, the communication technique may improve the user experience when using the electronic device and/or the recipient electronic device, and therefore may increase customer satisfaction and retention.

Note that the communication technique may be used during wireless communication between electronic devices in accordance with a communication protocol, such as a communication protocol that is compatible with an IEEE 802.11 standard (which is sometimes referred to as Wi-Fi). In some embodiments, the communication technique is used with IEEE 802.11ad and/or IEEE 802.11ay, which are used as illustrative examples in the discussion that follows. However, this communication technique may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, IEEE 802.11ad, IEEE 802.11ay or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, an auxiliary or virtual reality headset or display, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 9, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, electronic device 110-1 and access point 112 may exchange packets using a Wi-Fi communication protocol in a WLAN. Notably, radio 114-1 may receive wireless signals 116 that are transmitted by radio 114-2. Alternatively, radio 114-1 may transmit wireless signals 116 that are received by radio 114-2.

In some embodiments, wireless signals 116 are communicated using wavelengths in the microwave portion of the electromagnetic spectrum. For example, wireless signals 116 may be communicated using a 60 GHz frequency band. Moreover, electronic device 110-1 and access point 112 may transmit and receive wireless signals (such as wireless signals 116) using directional antenna patterns (such as a transmit antenna pattern and a receive antenna pattern). As noted previously, such millimeter-wave communication can provide ultrawide bandwidth and high spatial isolation.

However, millimeter-wave communication can be sensitive. For example, characteristics of the wireless link between electronic device 110-1 and access point 112 may vary dynamically. These variations can degrade the communication performance, such as a reduced throughput or an increased latency. These problems may be increased if a source (such as a video encoder (VE) 118, which may be included in access point 112 or another electronic device) provides content (such as video) having a fixed data rate, e.g., if video encoder 118 encodes video using a fixed video bit rate. Notably, a fixed video bit rate may limit the ability of access point 112 to adapt to a changing wireless environment without the communication performance being degraded, and/or may require increased system resources (such as more memory or higher power consumption). In some embodiments, video encoder 118 may adapt the video data rate based at least in part on rate feedback from a video decoder or another higher network layer in electronic device 110-1. However, this video-data-rate adaptation may suffer from long latency and lag relative to changes in the wireless environment.

As described further below with reference to FIGS. 2-8, in order to address this challenge, radio 114-2 in access point 112 may implement the communication technique to dynamically provide rate feedback to video encoder 118 based at least in part on one or more communication performance metrics associated with the wireless link between electronic device 110-1 and access point 112. This rate feedback may allow video encoder 118 to dynamically adapt the video bit rate, which may assist access point 112 in adapting to changes in the wireless environment.

For example, radio 114-2 may estimate a communication performance metric, such as an effective capacity of the wireless link. The effective capacity of the wireless link may be based at least in part on an efficiency of the wireless link. Notably, the effective capacity may be estimated based at least in part on: a PER of the wireless link, an MCS of the wireless link, an overhead associated with the packets or the frames communicated via the wireless link (such as a channel overhead and/or a system overhead), and/or a relative access time of access point 112 during communication with electronic device 110-1.

In some embodiments, the rate feedback corresponding to the communication performance metric may be predetermined. Consequently, in these embodiments, radio 114-2 may use a look-up table and the estimated communication performance metric to select the predetermined rate feedback. Alternatively, radio 114-2 may dynamically determine the rate feedback based at least in part on the estimated communication performance metric.

Millimeter-wave communication can be disrupted by motion or blockages in the wireless environment. When this occurs, access point 112 and electronic device 110-1 may perform beamforming to determine one or more directional antenna patterns in order to recover the wireless link. Moreover, when a beamforming condition occurs, radio 114-2 may reset the rate feedback.

In some embodiments, there may be multiple data streams, radio 114-2 may estimate multiple communication performance metrics associated with the multiple data streams, and the rate feedback may correspond to the multiple communication performance metrics. For example, the rate feedback may be a weighted average of the multiple communication performance metrics.

While the preceding discussion illustrated determination of the rate feedback based at least in part on the communication performance metric, in some embodiments the rate feedback is based at least in part on: an application associated with the data stream (such as an application the consumes or that provides the video), content associated with the data stream, and/or a QoS tolerance associated with the data stream (such as a PER threshold, an RSSI threshold, a signal-to-noise ratio or SNR threshold, a latency threshold, etc.).

In these ways, the communication technique may allow electronic devices 110 and access point 112 to communicate reliably and efficiently (such as with low latency and ultra-wide bandwidth), with high spatial isolation (and, thus, reduced interference and collisions). For example, the communication technique may allow access point 112 to match a video data rate to a data rate of a wireless link between one or more of electronic devices 110 and access point 112. This capability may allow electronic devices 110 and access point 112 to communicate using a 60 GHz frequency band, and may improve the user experience when using electronic devices 110 and/or access point 112.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, radio 114-2 may provide a trigger frame for the subset of recipient electronic devices. Moreover, after radio 114-1 receives a trigger frame, radio 114-1 may provide a group acknowledgment to radio 114-2. For example, radio 114-1 may provide the acknowledgment during an assigned time slot and/or in an assigned channel in the group acknowledgment. However, in some embodiments the one or more recipient electronic devices may individually provide acknowledgments to radio 114-2. Thus, after radio 114-1 receives the trigger frame, radio 114-1 (and, more generally, the main radios in the one or more recipient electronic devices) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate, packet error rate, etc.), a mean-square error of equalized signals relative to an equalization target, inter-symbol interference, multipath interference, an SNR, a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

High-definition, low latency video streaming over wireless links can provide an improved user experience. The ultrawide bandwidth and high spatial isolation provided by millimeter-wave communication may be useful in these applications. However, it can be challenging to support millimeter-wave communication.

For example, in comparison to a wired connection with a constant bandwidth, the wireless channel capacity may be time varying. Notably, there may be channel fading, which can result in packet loss, and which can adversely impact video quality. Moreover, because of the use of directional beams that are associated with directional antenna patterns, millimeter-wave communication may be sensitive to motion (such as blockage and rotation), which are sometimes referred to as 'scenario changes'. Therefore, in order to provide quality video, with wireless communication a video encoder may need to dynamically adjust the video bit rate to (e.g., on average) match the wireless channel capacity.

A stand-alone (wireless-unaware) video encoder that implements a video-rate-adaptation technique may adapt the video rate based at least in part on video packets loss. However, this adaptation may occur at a higher layer (such as a video or application layer). This may increase the latency, and may increase errors because the adaptation may be inaccurate and may always lag behind the wireless channel or link conditions.

In embodiments of the communication technique, an interface circuit in an electronic device may send a video rate recommendation (which is sometimes referred to as 'rate feedback') to a video encoder or module to assist in the video rate control.

Figure 2:
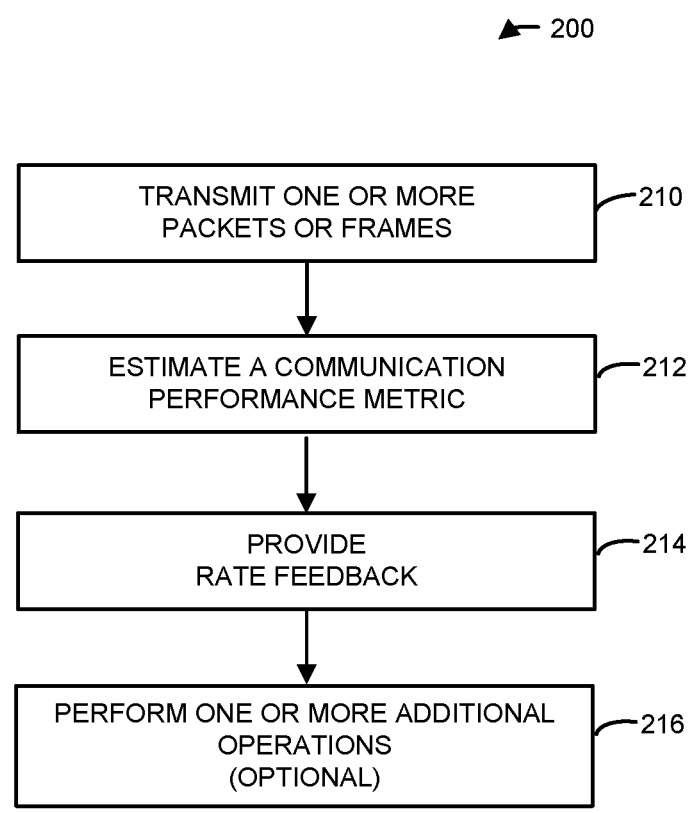
FIG. 2 is a flow diagram illustrating an example of a method for providing rate feedback using one of the electronic devices in FIG. 1.

FIG. 2 presents a flow diagram illustrating an example method 200 for providing rate feedback. This method may be performed by an electronic device, such as an interface circuit in access point 112 in FIG. 1. During operation, the electronic device may transmit one or more packets or frames (operation 210) associated with a data stream to a recipient electronic device. For example, the data stream may be associated with a video encoder.

Then, the electronic device may estimate a communication performance metric (operation 212) associated with the transmission of the one or more packets or frames. For example, the communication performance metric may include an effective capacity associated with a wireless link between the electronic device and the recipient electronic device.

Moreover, the effective capacity may be estimated based at least in part on an efficiency of the wireless link. For example, the effective capacity may be estimated based at least in part on: a PER of the wireless link, an MCS of the wireless link, an overhead associated with the one or more packets or the frames, and/or a relative access time of the electronic device during the transmissions.

Next, the electronic device may provide the rate feedback (operation 214) to the video encoder based at least in part on the estimated communication performance metric. Note that the rate feedback corresponding to the communication performance metric may be predetermined. Alternatively, the rate feedback corresponding to the communication performance metric may be dynamically determined.

In some embodiments, the electronic device optionally performs one or more additional operations (operation 216). For example, when a beamforming condition occurs, the electronic device may reset the rate feedback. Note that a beamforming condition may occur when there is a change in an SNR or an RSSI that is greater than a threshold, such as, e.g., 10 dB, or when there is packet loss (such as when no acknowledgment(s) are received).

Moreover, the rate feedback may be filtered. For example, the filtering may include low-pass filtering or averaging.

Furthermore, there may be multiple data streams, the electronic device may estimate multiple communication performance metrics associated with the multiple data streams, and the rate feedback may correspond to the multiple communication performance metrics. For example, the rate feedback may be a weighted average of the multiple communication performance metrics.

Additionally, in some embodiments, the rate feedback is based at least in part on: an application associated with the data stream, content associated with the data stream, and/or a QoS tolerance associated with the data stream (which may be provided by a higher layer).

Figure 3:
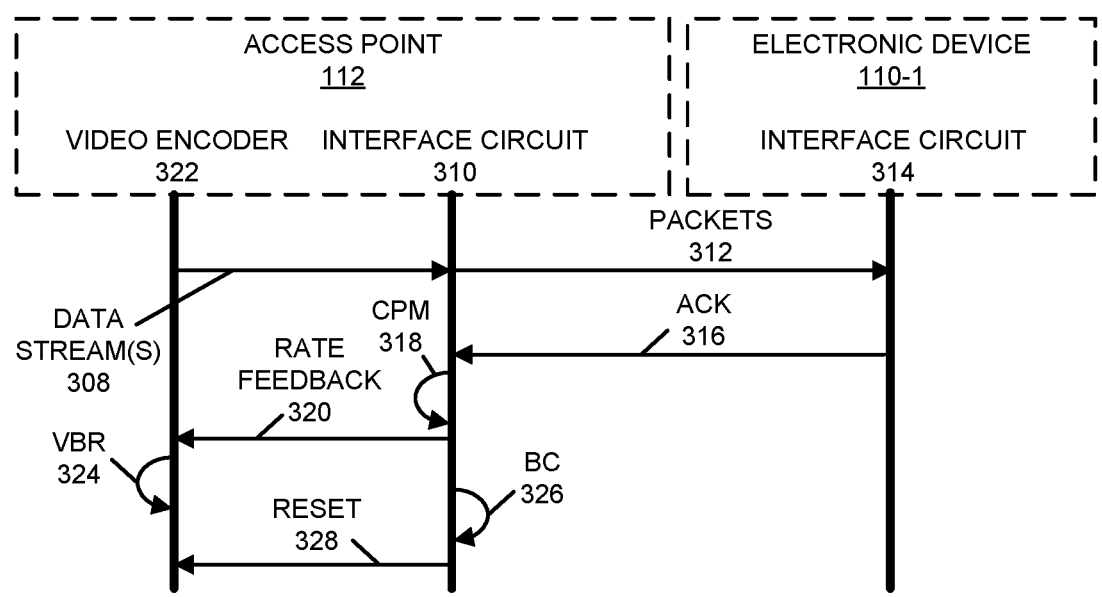
FIG. 3 is a flow diagram illustrating an example of communication between electronic devices, such as the electronic devices of FIG. 1.

The communication technique is further illustrated in FIG. 3, which presents a flow diagram illustrating an example of communication between electronic device 110-1 and access point 112. Interface circuit 310 in access point 112 may transmit one or more packets 312 or frames associated with one or more data streams 308 from a video encoder 322.

After receiving packets 312, interface circuit 314 in electronic device 110-1 may provide one or more acknowledgments (ACK) 316. Based at least in part on these acknowledgments, interface circuit 310 may determine or estimate at least a communication performance metric (CPM) 318 associated with the communication between access point 112 and electronic device 110-1. For example, the communication performance metric may be associated with communication of packets 312 using a wireless link between access point 112 and electronic device 110-1, such as an effective capacity of the wireless link.

Then, interface circuit 310 may provide rate feedback 320 associated with the data stream to the video encoder 322. Video encoder 322 may modify a video bit rate (VBR) 324 based at least in part on the rate feedback 320.

In some embodiments, when a beamforming condition (BC) 326 occurs, interface circuit 310 may provide a reset 328 (and, more generally, may modify rate feedback 320) that is provided to video encoder 322. Video encoder 322 may accordingly modify video bit rate 324.

While communication between the components in FIG. 3 are illustrated with unilateral or bilateral communication (e.g., lines having a single arrow or dual arrows), in general a given communication operation may be unilateral or bilateral.

In embodiments of the communication technique, an interface circuit (such as a media access control or MAC layer) may perform wireless link adaptation in order to detect a channel condition and to select an MCS for use when communicating wireless packets or frames. In general, a wireless link adaptation technique may track a set of MCS values and associated PER values. In the communication technique, the interface circuit may provide rate feedback, such as a recommended video rate, based at least in part on an estimate of an effective capacity or 'goodput' (e.g., a deliverable rate) that can be achieved using a particular MCS (or the corresponding data rate) and the associated PER.

As described further below, in order to accurately determine the rate feedback, the effective capacity may be determined using one or more adjustments or corrections. For example, the rate feedback may be $$f(\text{Goodput}) = f[R(\text{MCS}) \cdot (1 - \text{PER}) \cdot \text{adjustment}].$$

As discussed further below, note that the rate feedback may be filtered in order to help ensure that the video rate is stable.

In some embodiments, the rate feedback may be adjusted to correct for overhead associated with the wireless communication. Notably, the interface circuit may adjust the rate feedback for the physical (PHY) layer overhead in a packet or frame, which depends on the physical layer convergence procedure (PLCP) protocol data unit (PPDU) format. For example, in IEEE 802.11a packets or frames, the physical layer overhead may include the short training field (STF) duration, the long training field (LTF) duration, and the legacy signal field (L-SIG) duration. Moreover, in IEEE 802.11ac packets or frames, the physical layer overhead may include the STF duration, the LTF duration, the L-SIG field duration, the very high throughput signal A field (VHT-SIGA) duration, the very high throughput STF (VHT-STF) duration, the very high throughput LTF (VHT-LTF) duration, and the very high throughput signal B field (VHT-SIGB) duration. Furthermore, in IEEE 802.11ad packets or frames, the physical layer overhead may include the STF duration, the channel estimation field (CEF) duration, and the high data rate field (HDR) duration. Additionally, in IEEE 802.11ay packets or frames, the physical layer overhead may include the directional multi-Gigabit STF (DMG_STF) duration, the DMG_CEF duration, the DMG_HDR field duration, the enhanced DMG_HDR field (EDMG_HDR) duration, the EDMG_STF duration, and the EDMG_CEF duration. Thus, in some embodiments, the adjustment to the rate feedback is $$1 - \frac{PHY_{overhead}}{PPDU_{length}}.$$

In general, the PPDU length is dynamic. Consequently, estimates of the PPDU length may be used in the adjustment. For example, the adjustment may include or may be based at least in part on a long-term average or a filtered PPDU length (such as a moving average, a low-pass filtered PPDU length, etc.). Alternatively, in some embodiments, the maximum PPDU length is used in the adjustment.

In some embodiments, the interface circuit may adjust the rate feedback for the MAC layer overhead in a packet or frame. For example, for a MAC PDU (MPDU) frame, the MAC header may be included in the adjustment. Moreover, if an aggregated MPDU is used, then multiple MAC headers and delimiters may be included in the adjustment. Thus, in some embodiments, the adjustment to the rate feedback is $$1 - \frac{MAC_{overhead}}{MPDU_{length}}.$$

Note that an estimate of the number of MPDUs can be used, e.g., a long-term average or a filtered average of a number of MPDUs.

Moreover, in some embodiments, the interface circuit may adjust the rate feedback to correct for the channel access time or portion. For example, the adjustment may include a correction for the estimated channel access portion in a contention-based channel access, such as in IEEE 802.11a, IEEE 802.11g, IEEE 802.11n, IEEE 802.11ac, or IEEE 802.11ax, or the contention-based access period mode in IEEE 802.11ad or IEEE 802.11ay). The channel access portion can be estimated by tracking, over a period of time, using a sliding window, using a low-pass filter or by computing the average. In general, the channel access portion may be the fraction of transmit time for meaningful bits.

Figure 4:
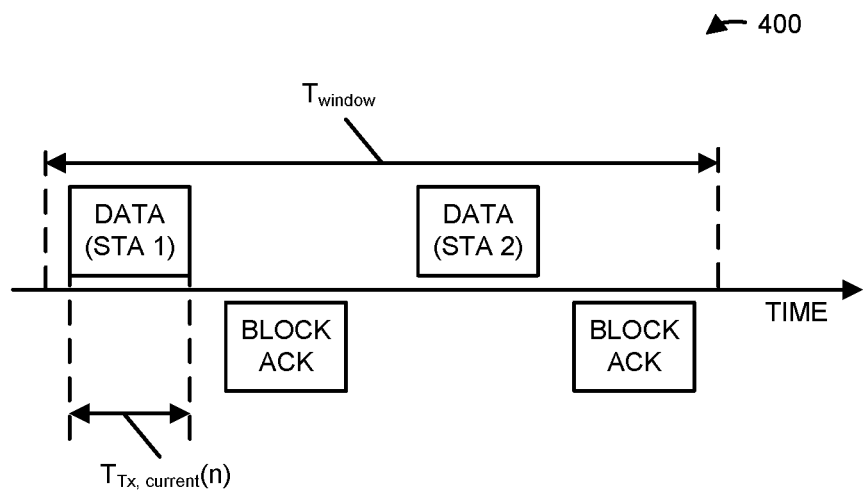
FIG. 4 is a timing diagram illustrating an example of communication between electronic devices, such as the electronic devices of FIG. 1.

FIG. 4 presents a timing diagram 400 illustrating an example of communication between electronic device 110-1 and access point 112, which illustrates the channel access time or portion. In this timing diagram, the transmit time of a current bit ($T_{Tx, current}(n)$) is shown relative to the duration $T_{window}$ of the $n^{th}$ window. In these embodiments, the adjustment may include $$\frac{T_{Tx}(n)}{T_{window}}.$$

In some embodiments, low-pass filtering can be applied, e.g., where $T_{Tx}(n)=(1-\alpha)\cdot T_{Tx}(n-1)+\alpha\cdot T_{Tx, current}(n)$, and $\alpha$ may be between, e.g., 0.01 and 0.1, or the low-pass filtering may correspond to a video frame or longer.

Furthermore, in some embodiments, the estimated channel access portion occurs when there is dedicated channel access, such as in the service period mode in IEEE 801.11ad or IEEE 802.11ay. For example, the channel access portion may be computed as the service period duration minus the turn-around time (such as the short interface frame or SIFS) and the response duration (such as the acknowledgment or the block acknowledgment frame). Note that there may be some unpredictable channel idle time, such as when there is insufficient time to transmit a packet after response, an acknowledgment or a block acknowledgment at the end of a service period. This unpredictable channel idle time may also be estimated using tracking over a period of time. Alternatively, the channel access portion may directly track the PPDU length. In some embodiments, the adjustment may include the portion of a service period during a beacon interval.

Figure 5:
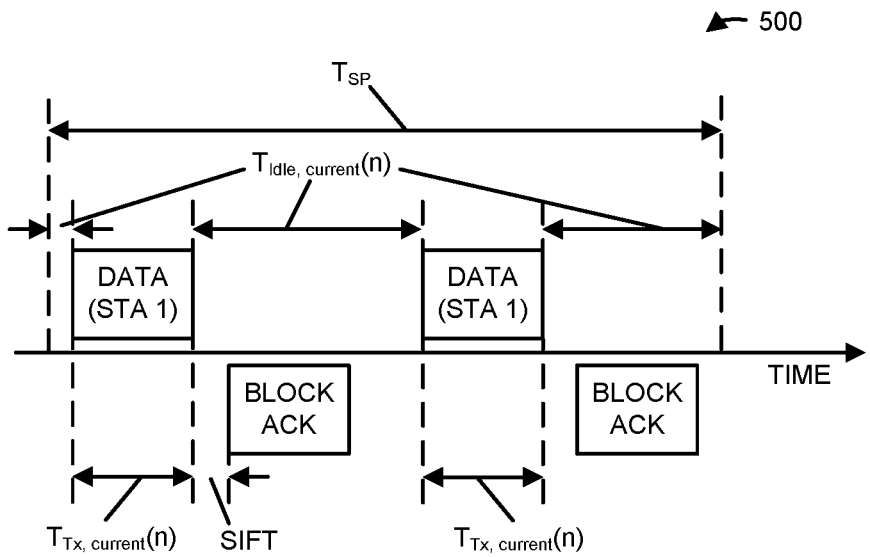
FIG. 5 is a timing diagram illustrating an example of communication between electronic devices, such as the electronic devices of FIG. 1.

FIG. 5 presents a timing diagram 500 illustrating an example of communication between electronic device 110-1 and access point 112, which illustrates the channel access portion when there is dedicated channel access. In this timing diagram, the transmit time of a current bit is shown relative to the duration $T_{sp}$ of the $n^{th}$ service period, the channel idle time ($T_{idle, current}(n)$) and the SIFS. In these embodiments, the adjustment may include $$\frac{T_{Tx}(n)}{T_{SP}} = 1 - \frac{T_{Idle}(n)}{T_{SP}}.$$

In some embodiments, low-pass filtering can be applied, e.g., where $T_{Tx}(n)=(1-\alpha)\cdot T_{Tx}(n-1)+\alpha\cdot T_{Tx, current}(n)$, $T_{Idle}(n)=(1-\alpha)\cdot T_{Idle}(n-1)+\alpha\cdot T_{Idle, current}(n)$ and $\alpha$ may be between, e.g., 0.01 and 0.1, or the low-pass filtering may correspond to a video frame or longer.

Additionally, in some embodiments, the interface circuit may adjust the rate feedback to correct for empirical values. For example, the adjustment may include a programmable scaling factor for other (unknown) factors, which may be set in firmware or software.

One or more of the preceding adjustments may be combined to accurately predict the effective capacity or goodput, e.g., $$R(MCS)\cdot(1-PER)\cdot scaling\cdot\left(\frac{T_{Tx}}{T_{window}}\right)\cdot$$
$$\left(1-\frac{MAC_{overhead}}{MPDU_{length}}\right)\cdot\left(1-\frac{PHY_{overhead}}{PPDU_{length}}\right).$$

Note that $R(MCS)\cdot(1-PER)$ may correct for the channel overhead, while $$\frac{T_{Tx}}{T_{window}}$$

may correct for network utilization. In some embodiments, the scaling (for unknowns) may be, e.g., between 0.6 and 1.1 (such as, e.g., 0.9).

Figure 6:
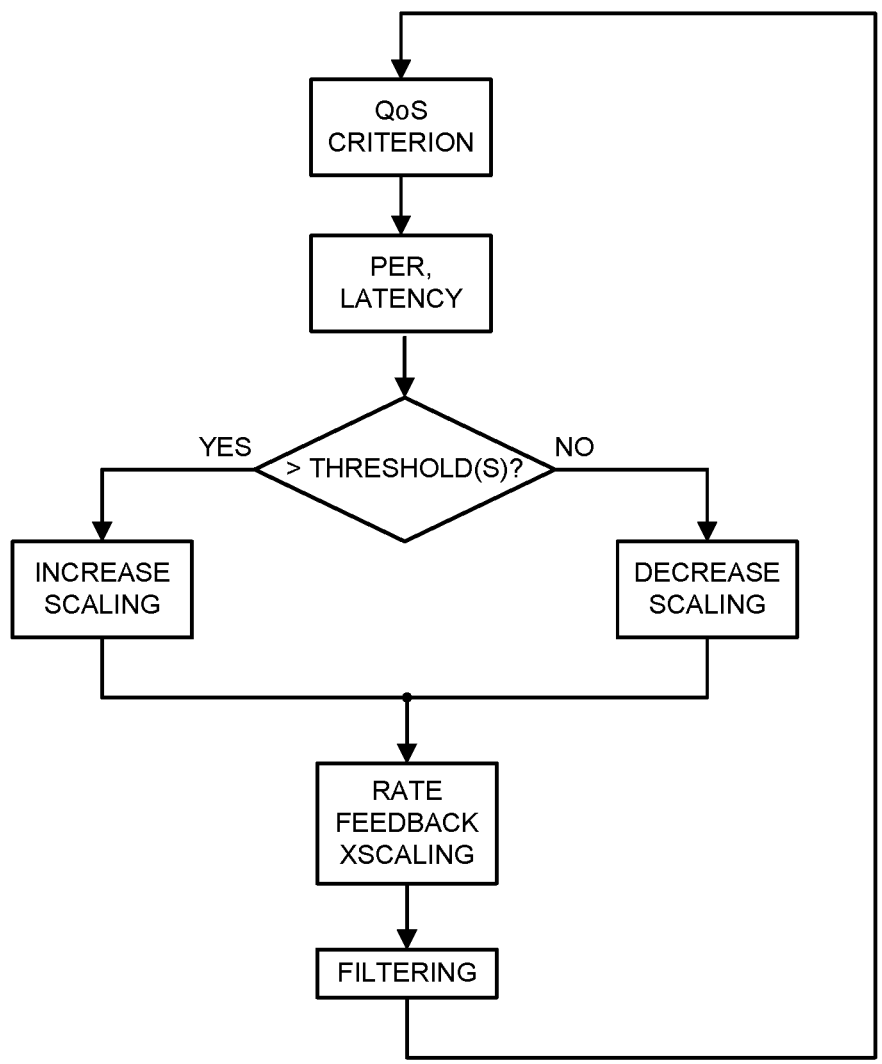
FIG. 6 is a flow diagram illustrating an example of a method for providing rate feedback using one of the electronic devices in FIG. 1.

Because of errors and small-scale variation/noise, the video rate control and feedback may not always match consistently. Consequently, the adjustment may be adapted to resolve the rate-feedback error and to follow the traffic/channel access variation. This is illustrated in FIG. 6, which presents a flow diagram illustrating an example of a method 600 for providing rate feedback. This method may be performed by an electronic device, such as access point 112 in FIG. 1. During operation, a video and/or an upper layer in the electronic device may specify a QoS criterion (such as a QoS tolerance). For example, the video and/or the upper layer may specify a latency threshold and/or a PER threshold, such as, e.g., 1 ms and 2-10%. Moreover, an interface circuit in access point 112 may estimate a latency and a PER (and, more generally, one or more communication performance metrics). Then, the latency and the PER may be, respectively, compared to the latency threshold and the PER threshold. The scaling factor may be accordingly increased or decreased. Notably, if the PER or the latency is greater than the target latency or PER threshold, the scaling may be decreased. Alternatively, if the PER or the latency is less than the target latency or PER threshold, the scaling may be increased. Next, the rate feedback may be appropriately scaled, and the filtered rate feedback may be provided to the video and/or the upper layer.

In some embodiments, if the PER is approximately zero, scaling up the rate feedback may effectively probing the video rate.

Note that the scaling increment may be a constant step or offset for each iteration, or may be based at least in part on the difference between target and current communication performance metric, such as the latency or the PER. Thus, as shown in FIG. 6, scaling(t) may equal scaling(t-1)±STEP if PER≤$PER_{threshold, low}$ or if PER>$PER_{threshold, high}$. Alternatively, scaling(t) may equal scaling(t-1)+g·(PER- PER$_{threshold}$), where g is a proportional value, e.g., between 0 and 1. Thus, in some embodiments of the communication technique absolute or relative adjustments to the scaling factor in the rate feedback are selectively applied based at least in part on video performance and/or wireless communication performance metrics (e.g., PER, latency, a QoS criterion, etc.).

In some embodiments, the video encoder provides multiple data streams associated with video. These data streams may have different QoS criteria (or priorities) and/or may have different MCS values. In these embodiments, the electronic device (such as access point 112) may determine multiple rate feedback values for the different data streams or may determine a single rate feedback value corresponding to the multiple data streams. For example, the single rate feedback value may be a weighted average of the rate feedback values for the different data streams.

Figure 7:
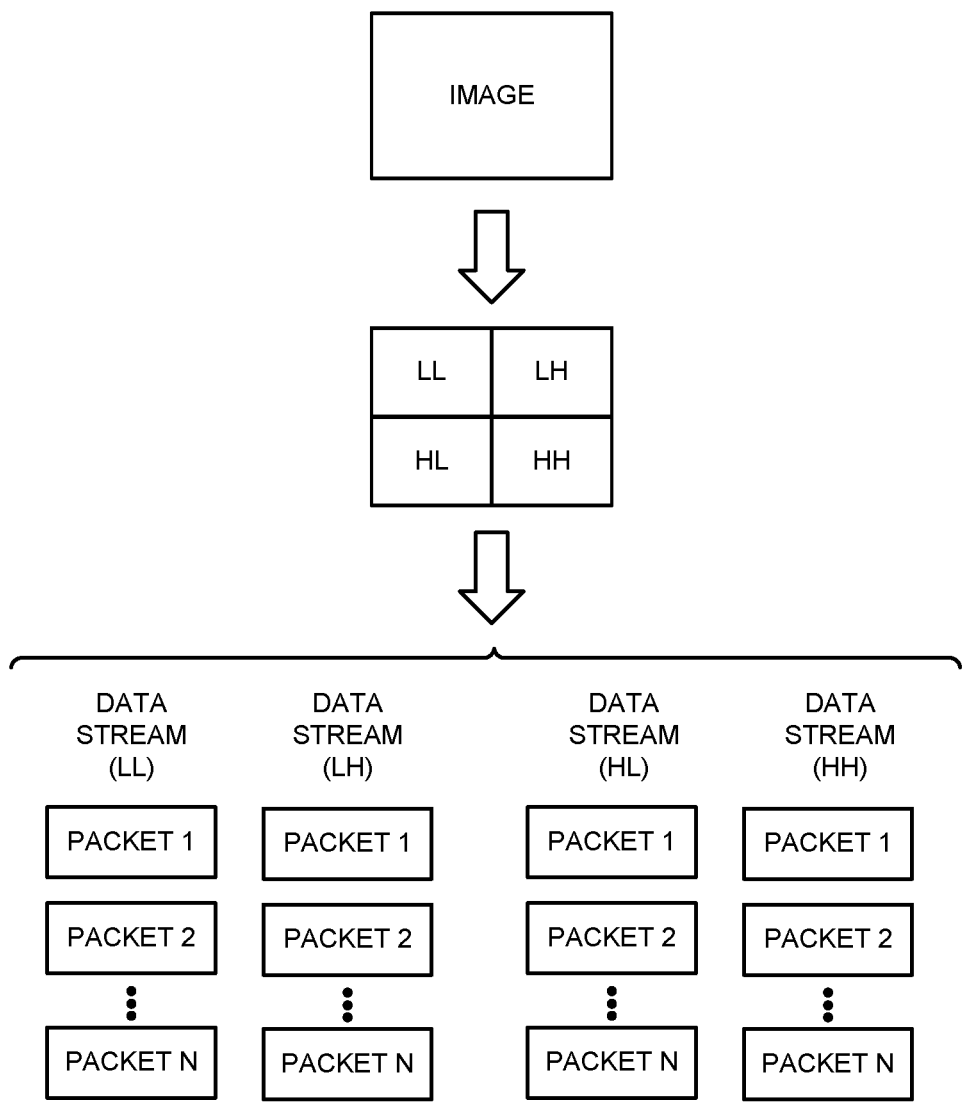
FIG. 7 is a drawing illustrating an example of multiple data streams communicated between electronic devices in FIG. 1.

For example, FIG. 7 presents a flow diagram illustrating an example of multiple data streams communicated between access point 112 and recipient electronic device 110-1, e.g., during video streaming. Notably, a transformation of video (such as a wavelet or discrete cosine transform), may result in different data streams. These data streams may be transmitted using different MCS values. For example, as shown in FIG. 7, there may be four different data streams associated with the LL, LH, HL and HH bands. Note that the LL band may be a base layer with coarse transformation coefficients, while the LH, HL and HH bands may include fine transformation coefficients. More generally, the different data streams may carry bits or information of different significance or importance.

In addition to different MCS values, the different data streams may have different QoS requirements or criteria. For example, the data stream associated with the LL band may be needed in order to obtain a rough image. Consequently, the associated QoS criterion may be that the PER threshold is less than 0.1-2% (to ensure that there are very few errors). However, the data stream associated with the HH band may be less important. Consequently, the associated QoS criterion may be that the PER threshold is equal to or greater than 5-10.0%

Note that one the data streams associated with the video streaming arrive in a MAC layer in a recipient electronic device, they may be placed into different QoS queues with different traffic identifiers.

Because of varying wireless conditions, in general, during millimeter-wave communication, the MCS values of the different data streams may need to be dynamically adapted in order to provide reliable wireless communication. For example, in bad communication conditions, the base layer may use an MCS of 0, 1 or 2 (with a data rate of up to 7 Gbps) and the other layers may, respectively, use MCS values of 3, 4 and 5. Alternatively, in good communication conditions, the base layer may use an MCS of 10, the second layer may use an MCS of 11, the third layer may use an MCS of 12, etc.

Figure 8:
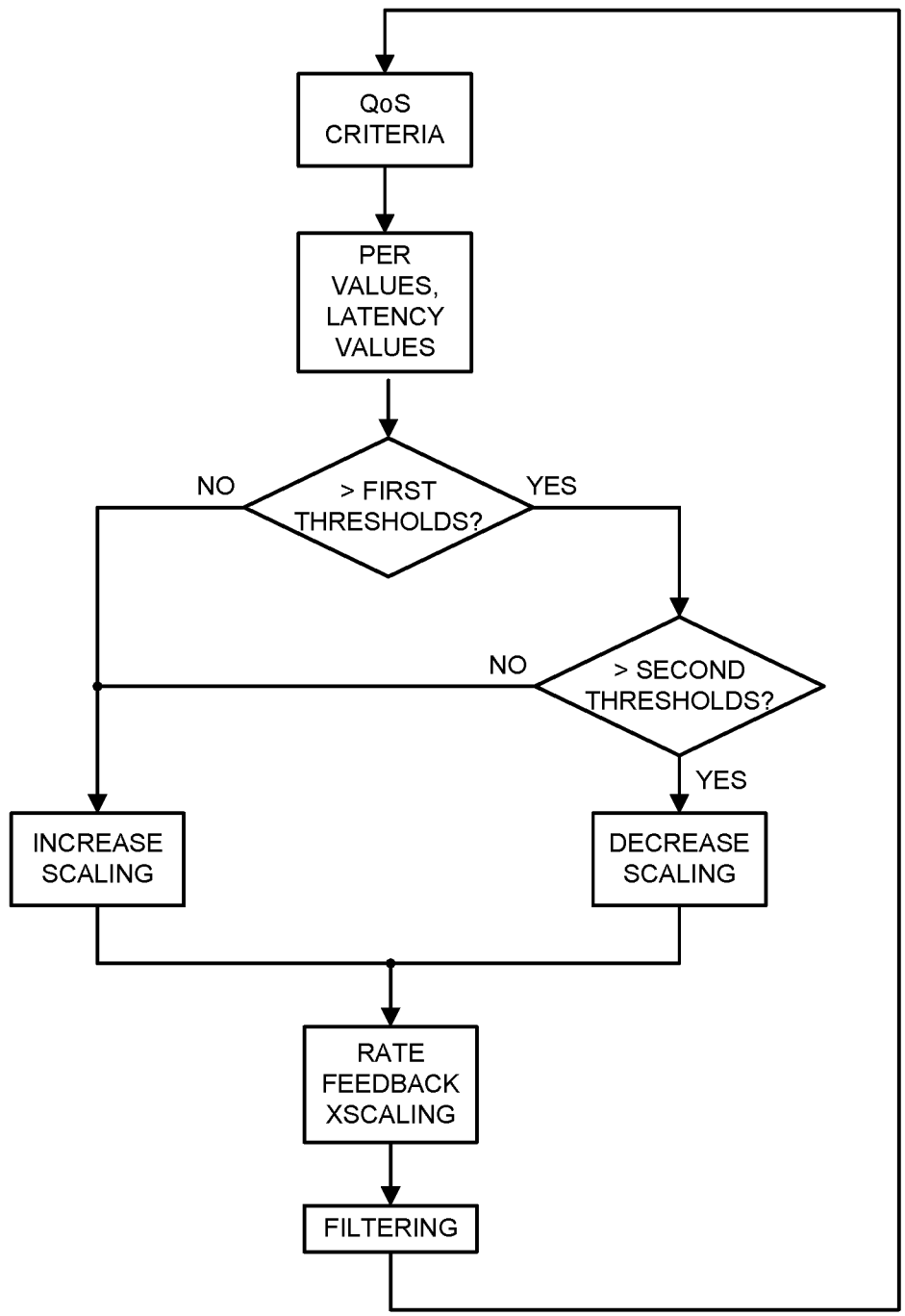
FIG. 8 is a flow diagram illustrating an example of a method for providing rate feedback using one of the electronic devices in FIG. 1.

FIG. 8 presents a flow diagram illustrating an example of a method 800 for providing rate feedback when there are multiple data streams. This method may be performed by an electronic device, such as access point 112 in FIG. 1. During operation, a video and/or an upper layer in the electronic device may specify QoS criteria (such as QoS tolerances) for different data streams. For example, the video and/or the upper layer may specify latency thresholds and/or PER thresholds, such as, e.g., 0.1-1 ms and 2-10%. In some embodiments, a high priority data stream may have a lower PER threshold and/or a smaller latency threshold. Moreover, an interface circuit in access point 112 may estimate latency and PER values (and, more generally, one or more communication performance metrics) for the different data streams. If the latency and/or the PER of each of the data streams is less than the corresponding thresholds, the scaling factor may be increased. Otherwise, the scaling factor may be decreased. Next, a single rate feedback value may be appropriately scaled, and the filtered rate feedback may be provided to the video and/or the upper layer.

In some embodiments in which the rate feedback is provided to multiple data streams, an individual rate feedback is provided for each data stream, or each group of data streams. Therefore, the preceding embodiments can be applied independently or concurrent (e.g., in parallel) for each feedback path.

Moreover, in some embodiments, the rate feedback is a weighted sum or another function of the PER values of the data streams. Alternatively, data stream-by-data stream (in QoS order) PER values may be compared to corresponding PER thresholds or targets.

In some embodiments of methods 200, 600, and/or 800, there may be additional or fewer operations. Moreover, the order of the operations may be changed, and/or two or more operations may be combined into a single operation or performed at least partially in parallel.

In some embodiments, at least some of the operations in methods 200, 600, and/or 800 are performed by an interface circuit in the electronic device. For example, at least some of the operations may be performed by firmware executed by an interface circuit, such as firmware associated with a MAC layer, as well as one or more circuits in a physical layer in the interface circuit.

As noted previously, in some embodiments the rate feedback is filtered. Notably, there may be frequent, small-variation changes in the wireless channel or link condition (e.g., small-scale fading). However, the video encoder may not correctly adapt the video data rate to such small-scale fading. This may result in fast video quality changes that can cause visual discomfort and, more generally, that degrade the user experience. Consequently, the interface circuit may filter out such fast variations in the rate feedback.

For example, the interface circuit may apply a low-pass filter when determining or estimating the effective capacity or goodput. Notably, as discussed previously, a 1-tap infinite impulse response (IIR) may be applied to the rate feedback. Alternatively, the rate feedback may be based at least in part on an average PPDU, a maximum length PPDU, or the PPDU(s) for the last or most-recent frame.

Moreover, in some embodiments, the interface circuit may quantize the estimated effective capacity or goodput based at least in part on a step size (STEP). For example, $$\text{Rate Feedback}(t) = \left[\frac{\text{Capacity}(t)}{\text{STEP}}\right] \cdot \text{STEP}.$$

Furthermore, in some embodiments, the interface circuit may set a threshold to trigger the providing of the rate feedback. Notably, unless the change in the capacity exceeds a threshold, the rate feedback may not be provided. For example, $$\text{Rate Feedback}(t) = \begin{cases} \text{Capacity}(t_o) & \text{when}|\text{Capacity}(t) - \text{Capacity}(t_o)| \leq \text{Threshold} \\ \text{Capacity}(t) & \text{when}|\text{Capacity}(t) - \text{Capacity}(t_o)| \geq \text{Threshold} \end{cases}.$$

In some embodiments, the video encode may dynamically exclude data based at least in part on the rate feedback. Furthermore, the video data rate of the video encoder may involve further smoothing or filtering of the rate feedback.

However, sometimes smoothing or filtering of the rate feedback is not desired. For example, when beamforming occurs to retrain or reestablished the wireless link, the channel condition may be significantly changed. This is especially true in millimeter-wave communication, which can be very sensitive to scenario changes. When a beamforming condition occurs, the rate feedback may provide a new initialization point for the video-data-rate control in the video encoder. Consequently, the interface circuit may report a condition or a state to the video encoder (and, more generally, to the video layer) in addition to the recommended rate feedback. For example, when a beamforming condition occurs, the interface circuit may report or may provide a 'hard reset' condition to indicate that the video data rate should be reset regardless of any smoothing of filtering of the rate feedback. Alternatively, when the beamforming condition does not occur, the interface circuit may report or may provide a 'soft update' condition.

In some embodiments, the beamforming condition may be identified based on an MCS and/or SNR, which may change suddenly when the wireless link changes (such as because of a scenario change). When the beamforming condition occurs, filtering of the rate feedback in the interface circuit and/or the video encoder may be suspended and the video data rate may be reset (such as to a reduced or a minimum value).

In summary, the communication technique may provide rate feedback to a video encoder, so that the video data rate approximately tracks the effective capacity of a wireless channel or link. Notably, in order to facilitate video rate control for video streaming over a wireless link, the interface circuit may report or provide the rate feedback (such as a proper video rate) to the video encoder. The rate feedback may be a filtered channel capacity or goodput estimate. Moreover, the channel capacity or goodput may be adjusted to accurately reflect the wireless-link efficiency. Furthermore, the channel capacity or goodput may be filtered to remove the small-scale (fast) variation in order to provide a smooth visual effect. Additionally, the rate feedback may be also conditioned (e.g., using a 'hard reset' or 'soft update' condition) depending on whether a beamforming condition occurs. The communication technique may allow low-latency and reliable millimeter-wave communication using a 60 GHz frequency band, such as in IEEE 802.11ad, IEEE 802.11ay, and/or another next generation 60 GHz communication protocol.

We now describe embodiments of an electronic device. FIG. 9 presents a block diagram of an electronic device 900 (which may be a cellular telephone, an access point, another electronic device, etc.) in accordance with some embodiments. This electronic device includes processing subsystem 910, memory subsystem 912, and networking subsystem 914. Processing subsystem 910 includes one or more devices configured to perform computational operations. For example, processing subsystem 910 can include one or more microprocessors, application-specific integrated circuits (ASICs), microcontrollers, graphics processing units (GPUs), programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), a read-only memory (ROM), flash memory, and/or other types of memory. In some embodiments, instructions for processing subsystem 910 in memory subsystem 912 include: program instructions or sets of instructions (such as program instructions 922 or operating system 924), which may be executed by processing subsystem 910. For example, a ROM can store programs, utilities or processes to be executed in a non-volatile manner, and DRAM can provide volatile data storage, and may store instructions related to the operation of electronic device 900. Note that the one or more computer programs may constitute a computer-program mechanism, a computer-readable storage medium or software. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910. In some embodiments, the one or more computer programs are distributed over a network-coupled computer system so that the one or more computer programs are stored and executed in a distributed manner.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Figure 9:
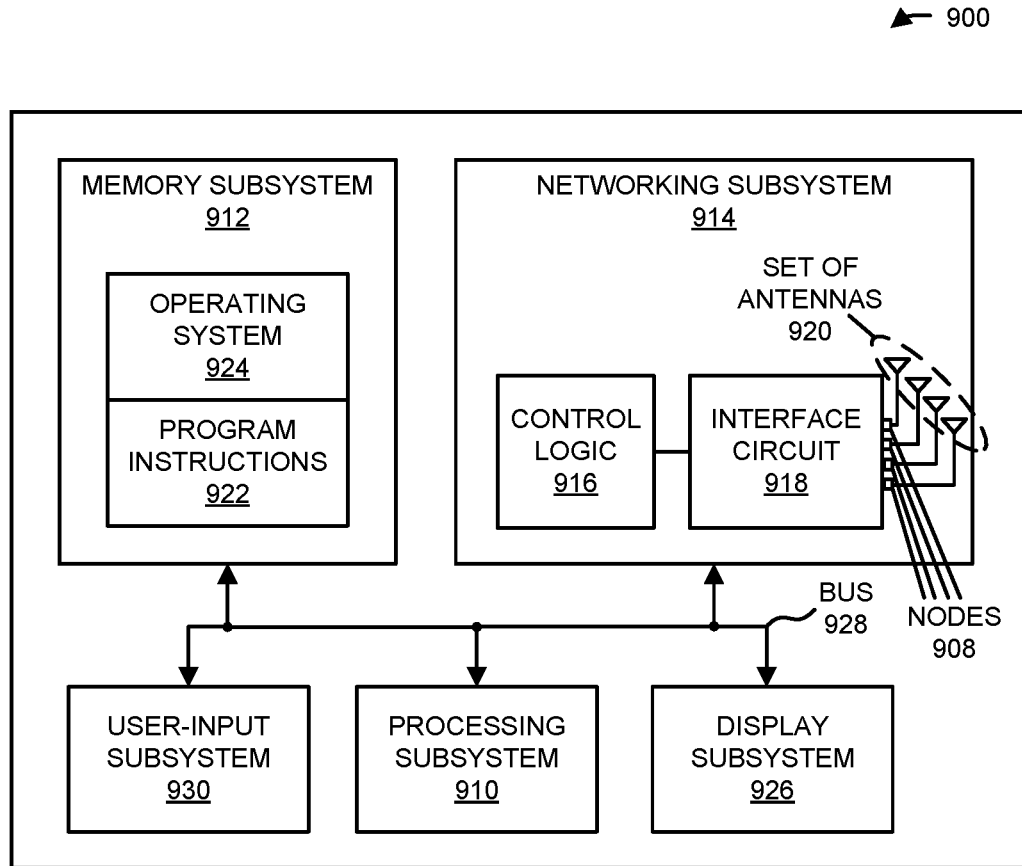
FIG. 9 is a block diagram illustrating an example of one of the electronic devices of FIG. 1.

Networking subsystem 914 includes one or more devices configured to couple to and communicate on a wired and/or wireless network (i.e., to perform network operations), including: control logic 916, an interface circuit 918 and a set of antennas 920 (or antenna elements) in an adaptive array that can be selectively turned on and/or off by control logic 916 to create a variety of optional antenna patterns or 'beam patterns.' (While FIG. 9 includes set of antennas 920, in some embodiments electronic device 900 includes one or more nodes, such as nodes 908, e.g., a pad, which can be coupled to set of antennas 920. Thus, electronic device 900 may or may not include set of antennas 920.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 914 includes one or more radios, such as a wake-up radio that is used to receive wake-up frames, and a main radio that is used to transmit and/or receive frames or packets during a higher-power mode. The wake-up radio and the main radio may be implemented separately (such as using discrete components or separate integrated circuits) or in a common integrated circuit.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or frame frames and/or scanning for advertising frames transmitted by other electronic devices.

Within electronic device 900, processing subsystem 910, memory subsystem 912, and networking subsystem 914 are coupled together using bus 928 that facilitates data transfer between these components. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc. Display subsystem 926 may be controlled by processing subsystem 910 to display information to a user (e.g., information relating to incoming, outgoing, or an active communication session).

Electronic device 900 can also include a user-input subsystem 930 that allows a user of the electronic device 900 to interact with electronic device 900. For example, user-input subsystem 930 can take a variety of forms, such as: a button, keypad, dial, touch screen, audio input interface, visual/image capture input interface, input in the form of sensor data, etc.

Electronic device 900 can be (or can be included in) any electronic device with at least one network interface. For example, electronic device 900 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, an auxiliary or virtual reality headset or display, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. This integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 922, operating system 924 (such as a driver for interface circuit 918) or in firmware in interface circuit 918. Alternatively or additionally, at least some of the operations in the communication technique may be implemented in a physical layer, such as hardware in interface circuit 918. In some embodiments, the communication technique is implemented, at least in part, in a MAC layer and/or in a physical layer in interface circuit 918.

While examples of numerical values are provided in the preceding discussion, in other embodiments different numerical values are used. Consequently, the numerical values provided are not intended to be limiting.

While the preceding embodiments illustrated communication between an electronic device and a recipient electronic device, in other embodiments the communication technique may be used during communication between an electronic device (which may be other than or different from an access point) and the recipient electronic device. Moreover, while the preceding embodiments illustrated communication in a 60 GHz frequency band, in other embodiments the communication technique may be used during communication in another or a different frequency band, such as: 900 MHz, 2.4 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a node configured to communicatively couple to an antenna; and
an interface circuit, communicatively coupled to the node, configured to communicate with a recipient electronic device, and configured to:
transmit, via the node, one or more packets or frames associated with a data stream that are intended for the recipient electronic device, wherein the data stream is associated with a video encoder;
estimate a communication performance metric associated with at least the transmission of the one or more packets or frames; and
provide rate feedback intended for the video encoder based at least in part on the estimated communication performance metric and a filtered physical layer convergence procedure protocol data unit (PPDU) length in the one or more packets or frames.

2. The electronic device of claim 1, wherein the estimated communication performance metric comprises an effective capacity associated with a wireless link between the electronic device and the recipient electronic device.

3. The electronic device of claim 2, wherein the effective capacity is estimated based at least in part on an efficiency of the wireless link.

4. The electronic device of claim 2, wherein the effective capacity is estimated based at least in part on a packet-error rate (PER) and/or a modulation coding scheme (MCS) of the wireless link.

5. The electronic device of claim 2, wherein the effective capacity is estimated based at least in part on an overhead of a physical layer associated with the packets or the frames.

6. The electronic device of claim 2, wherein the effective capacity is estimated based at least in part on a relative dynamic access time of a channel of the electronic device during the transmissions.

7. The electronic device of claim 1, wherein the electronic device comprises an access point.

8. The electronic device of claim 1, wherein the rate feedback corresponding to the communication performance metric may be predetermined.

9. The electronic device of claim 1, wherein the rate feedback corresponding to the communication performance metric is dynamically determined.

10. The electronic device of claim 1, wherein the rate feedback is reset when a beamforming condition occurs.

11. The electronic device of claim 1, wherein the rate feedback corresponds to low-pass filtering of the estimated communication performance metric.

12. The electronic device of claim 1, wherein the interface circuit is configured to:
transmit multiple data streams associated with a transformation of a video, wherein the data streams have different quality-of-service (QoS) criteria or priorities; and
estimate multiple communication performance metrics, with each communication performance metric corresponding to a respective data stream of the multiple data streams; and
wherein the rate feedback corresponds to the multiple communication performance metrics.

13. The electronic device of claim 1, wherein the rate feedback is based at least in part on at least one of: an application associated with the data stream, content associated with the data stream, or a quality-of-service (QoS) tolerance associated with the data stream.

14. A non-transitory computer-readable storage medium for use in conjunction with an electronic device, the computer-readable storage medium storing program instructions that, when executed by the electronic device, cause the electronic device to provide rate feedback by carrying out one or more operations comprising:
transmitting, to a recipient electronic device, one or more packets or frames associated with a data stream, wherein the data stream is associated with a video encoder;
estimating a communication performance metric associated with the transmission of the one or more packets or frames; and
providing rate feedback intended for the video encoder based at least in part on the estimated communication performance metric and a filtered physical layer convergence procedure protocol data unit (PPDU) length in the one or more packets or frames.

15. The computer-readable storage medium of claim 14, wherein the estimated communication performance metric comprises an effective capacity associated with a wireless link between the electronic device and the recipient electronic device.

16. The computer-readable storage medium of claim 14, wherein the rate feedback is reset when a beamforming condition occurs.

17. The computer-readable storage medium of claim 14, wherein the one or more operations comprises:
   transmitting one or more packets of frames associated with multiple data streams that are associated with a transformation of a video, wherein the data streams have different quality-of-service (QoS) criteria or priorities; and
   estimating multiple communication performance metrics, wherein each of the multiple communication performance metrics is associated with a data stream of the multiple data streams; and
   wherein the rate feedback corresponds to the multiple communication performance metrics.

18. The computer-readable storage medium of claim 14, wherein the rate feedback is based at least in part on at least one of: an application associated with the data stream, content associated with the data stream, or a quality-of-service (QoS) tolerance associated with the data stream.

19. A method for providing rate feedback, comprising:
   by an electronic device:
   transmitting, to a recipient electronic device, one or more packets or frames associated with a data stream, wherein the data stream is associated with a video encoder;
   estimating a communication performance metric associated with the transmission of the one or more packets or frames; and
   generating rate feedback for the video encoder based at least in part on the estimated communication performance metric and a filtered physical layer convergence procedure protocol data unit (PPDU) length in the one or more packets or frames.

20. The method of claim 19, wherein the estimated communication performance metric comprises an effective capacity associated with a wireless link between the electronic device and the recipient electronic device.

* * * * *